(12) United States Patent
Peri

(10) Patent No.: US 9,037,397 B2
(45) Date of Patent: May 19, 2015

(54) SYSTEM AND METHOD FOR GENERATING ALTERNATIVE ROUTES

(75) Inventor: Omer Shmuel Peri, Ra'anana (IL)

(73) Assignee: Intel Corporation, Santa Clara, CA (US)

(*) Notice: Subject to any disclaimer, the term of this patent is extended or adjusted under 35 U.S.C. 154(b) by 782 days.

(21) Appl. No.: 12/958,135

(22) Filed: Dec. 1, 2010

(65) Prior Publication Data
US 2011/0137551 A1 Jun. 9, 2011

Related U.S. Application Data

(60) Provisional application No. 61/267,291, filed on Dec. 7, 2009.

(51) Int. Cl.
G01C 21/34 (2006.01)
(52) U.S. Cl.
CPC .................... G01C 21/3453 (2013.01)
(58) Field of Classification Search
None
See application file for complete search history.

(56) References Cited

U.S. PATENT DOCUMENTS

| 5,878,368 | A  | * | 3/1999  | DeGraaf ............... 701/411 |
| 6,484,092 | B2 | * | 11/2002 | Seibel ................. 701/465 |
| 6,615,133 | B2 | * | 9/2003  | Boies et al. ........... 701/533 |
| 6,898,516 | B2 |   | 5/2005  | Pechatnikov et al. |
| 2003/0225508 | A9 | * | 12/2003 | Petzold et al. ......... 701/201 |
| 2005/0071119 | A1 | * | 3/2005  | Obradovich et al. ..... 702/150 |
| 2007/0021905 | A1 | * | 1/2007  | Takashima et al. ...... 701/201 |
| 2009/0192705 | A1 | * | 7/2009  | Golding et al. ......... 701/201 |

* cited by examiner

Primary Examiner — Paul Danneman
(74) Attorney, Agent, or Firm — Trop, Pruner & Hu, P.C.

(57) ABSTRACT

A system and method for generating routes is provided. Weights may be computed and associated with route segments. A start and end point may be received. At least one base route from a start to an end point may be generated. A number of alternative routes may be generated and related to the base route. Scores may be computed for routes based on weights associated with relevant segments. Routes may be selected for presentation based on their respective scores.

20 Claims, 5 Drawing Sheets

| | RESTAURANTS AND SERVICES | SAFETY | SPEED | TIME | TRAFFIC LOAD | SERVICES | SCENIC |
|---|---|---|---|---|---|---|---|
| 201 to 203 | 0 | 10 | 10 | 10 | 3 | 2 | 0 |
| 203 to 202 | 0 | 10 | 10 | 10 | 3 | 2 | 0 |
| 201 to 204 | 0 | 3 | 4 | 6 | 10 | 5 | 0 |
| 204 to 202 | 6 | 3 | 3 | 2 | 10 | 7 | 10 |
| 205 to 202 | 0 | 10 | 10 | 10 | 3 | 2 | 0 |
| 201 to 206 | 6 | 7 | 5 | 6 | 10 | 7 | 10 |
| 206 to 202 | 10 | 7 | 3 | 4 | 6 | 10 | 3 |
| 201 to 205 | 2 | 1 | 5 | 6 | 10 | 7 | 10 |

SYSTEM AND METHOD FOR GENERATING ALTERNATIVE ROUTES

CROSS REFERENCE TO RELATED APPLICATIONS

This application claims the benefit of U.S. Provisional Ser. No. 61/267,291, filed on Dec. 7, 2009, which is incorporated in its entirety herein by reference.

BACKGROUND OF THE INVENTION

Advancements in computing and other fields have enabled development of various systems and technologies related to navigation and route or travel planning. For example, a global positioning system (GPS) provides reliable positioning, navigation, and timing services to worldwide users. A GPS device may operate under practically any weather, in any part of the globe and may provide various services related to navigation or positioning.

Web based systems, e.g., Google® maps, as well as other systems, provide map-based services. Such systems typically provide information such as street names, shortest route from a starting location to an end or destination location, as well as directions to be followed in order to travel from one place to another. Information typically provided by such systems typically includes road numbers, distances and the like.

Current systems are typically designed to generate a single route based on one or more user-provided constraints. For example, a current system may provide a route from a first location to a second location, based on shortest distance, shortest expected time, maximal or minimal use of highways, cheapest route, i.e., avoiding toll roads. However, planning or generating a route as done by current systems is typically based on limited, predefined parameters. There is a need in the art for a system and method to enable a generation of a route based on any applicable parameters or user preferences, and flexibility to provide a plurality of routes based on a variety of constraints.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Figure 1:
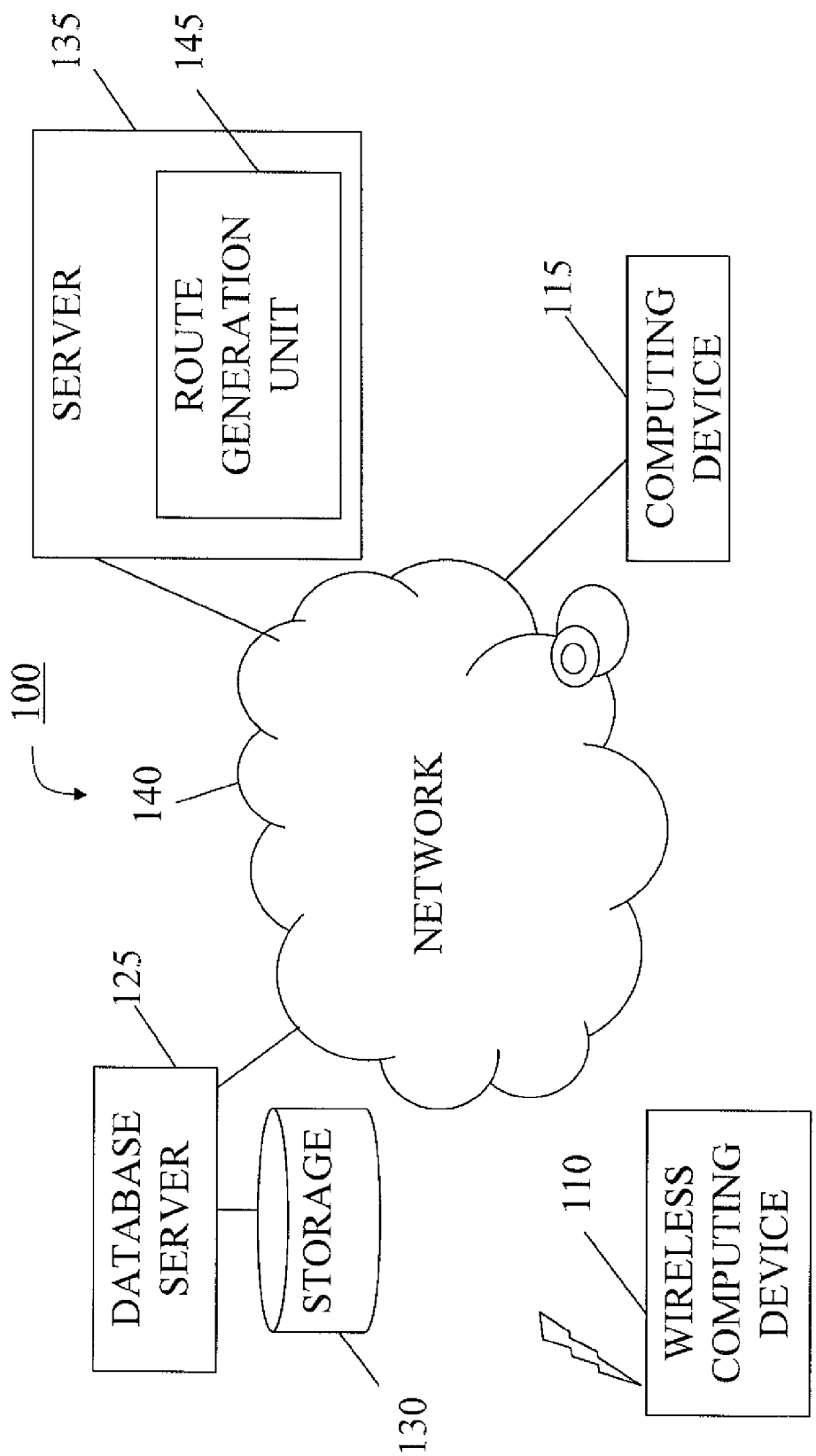
FIG. 1 is a schematic block diagram of an exemplary system according to embodiments of the invention.

Reference is now made to FIG. 1, which shows a schematic block diagram of an exemplary system 100 according to embodiments of the invention. System 100 may include a network 140, a mobile computing device 110 connected to network 140 by a wireless connection, a computing device 115 connected to network 140 by a wired connection, a navigation server 135, a route generation unit 145, a database server 125 and a storage 130 operatively connected to database server 125.

According to embodiments of the present invention, computing device 115 may be a client computing device, e.g., a computing device owned and operated by a private individual. For example, computing device 115 may be or may include a personal computer, a desktop computer, a laptop computer, a notebook computer, a terminal, a workstation, a server computer, a mobile GPS device, a Personal Digital Assistant (PDA) device, a tablet computer, a network device, a household appliance, or any other suitable computing device.

According to embodiments of the present invention, navigation server 135 and database server 125 may be any one or more suitable server computer as known in the art, e.g., a web or application server. For example, navigation server 135 and database server 125 may be or may include a personal computer, a desktop computer, a workstation, a server computer, a tablet computer, a network device and/or any other suitable computing device. According to embodiments of the present invention, storage 130 may include, for example, a hard disk drive, a floppy disk drive, a Compact Disk (CD) drive, a CD-Recordable (CD-R) drive, or other suitable removable and/or fixed storage unit. Navigation server 135 and/or database server 125 may include a processor and a memory unit, which may comprise for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Wireless computing device 110 may be or may include a wireless personal digital assistant (PDA) device, a mobile or cellular phone, a mobile computer or any computing device equipped with wireless communication capabilities and/or otherwise capable of wirelessly communicating with other computing devices or networks. For example, wireless computing device 110 may be able to communicate with navigation server 135, database 125 and/or computing device 115. It will be noted that any computing device may benefit from embodiments of the invention and may function as described herein with reference to computing devices 110 and/or 115.

Network 140 may be, may comprise or may be part of a private or public IP network, or the internet, or a combination thereof. Additionally or alternatively, network 140 may be, comprise or be part of a global system for mobile communications (GSM) network. For example, network 140 may include or comprise an IP network such as the internet, a GSM related network and any equipment for bridging or otherwise connecting such networks as known in the art. In addition, network 140 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 140 are implied but not shown, e.g., access points, base stations, communication satellites, GPS satellites, routers, telephone switches, etc. It will be recognized that embodiments of the invention are not limited by the nature of network 140.

Route generation unit 145 may be or may comprise software, hardware, firmware or any combination thereof. For example, route generation unit 145 may be a software application executing on navigation server 135. Route generation unit 145 may interact with database server 125 to obtain any applicable information, e.g., mapping or cartographical information, traffic reports, weather reports, user profiles or any other related information that may be stored, for example on storage 130. Route generation unit 145 may interact with user devices. For example, information related to generated routes may be communicated by route generation unit 145 to wireless computing device 110 or computing device 115. Such communicated information may enable user devices, e.g., wireless computing device 110 or computing device 115, to graphically and/or audibly present routes to a user. For the sake of simplicity, not all entities route generation unit 145 may interact with are shown in FIG. 1, however, route generation unit 145 may interact with any computing device, system or network in order to obtain information, data or parameters that may be used to generate routes as described herein. Although route generation unit 145 is shown with relation to navigation server 135, e.g., as an application thereon, route generation unit 145 may be operatively connected to any suitable computing device. For example, route generation unit 145 may be an application running on wireless computing device 110 or on computing device 115. Any functionalities, characteristics or aspects related to route generation unit 145 as described herein may be realized on any suitable computing device as described herein.

It will be noted that although a typical implementation of embodiments of the invention may be related to using a car to travel by roads, other implementations are just as applicable. For example, embodiments of the invention may be applicable to tourist pedestrians or motorists in a city, hikers in a national park having a multitude of trails, drivers on a cross country trip, or any suitable or applicable circumstances as described herein. For example, the routes and route segments described herein may be paths, streets, roads, highways, (and segments thereof), walked by hikers or traveled by mountain bikers, driven by motorists, or they may be naval or maritime routes and route sections, etc.

Figure 2:
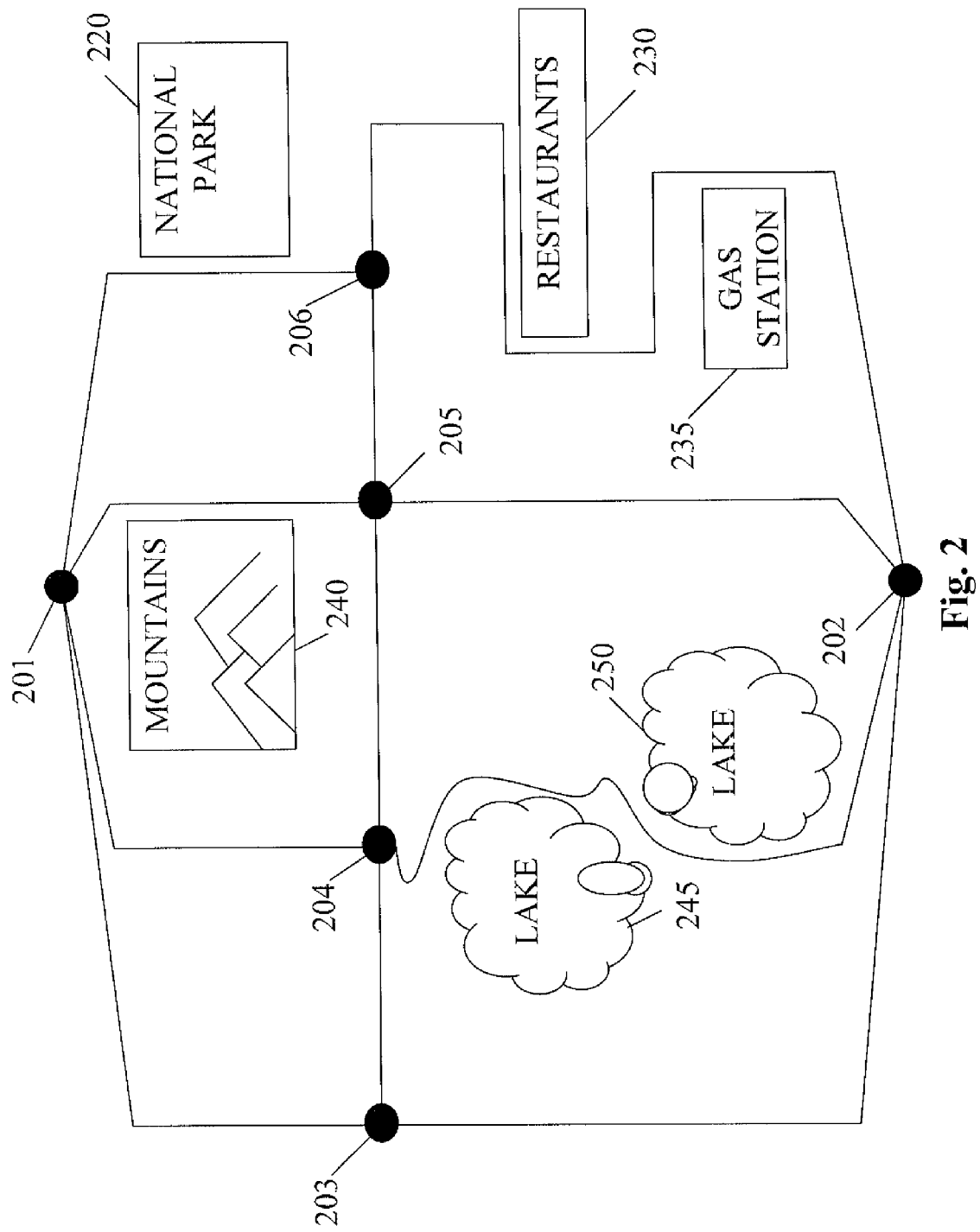
FIG. 2 is a schematic view of exemplary route segments according to embodiments of the invention.

Reference is now made to FIG. 2, which shows a schematic view of exemplary routes and route segments according to embodiments of the invention, including an exemplary starting point or location 201, a destination or end point 202 and exemplary intermediate points 203, 204, 205 and 206 that may be any locations on possible routes from starting point 201 to end point 202. As shown, points 201, 202, 203, 204, 205 and 206 may be used to denote or represent end points of route segments. For example, the route starting at point 201 through point 205 to point 202 (shown by the line connecting point 201 to point 205 and the line connecting point 205 to point 202) has two route sections or segments, the first being the section or segment from point 201 to point 205 (shown by the line connecting point 201 to point 205) and the second being the section or segment from point 205 to point 202 (shown by the line connecting point 205 to point 202). For the sake of simplicity, sections or segments will be denoted by their respective start and end points. For example, the segment from point 205 to point 202 may be referred to herein as segment 205-202. It will be noted that the "start" and "end" points related to a segment or route are used herein in the context of a known travel direction that may be from point 201 to point 202, however, such designation of points has no limiting aspect and this terminology is used herein for the sake of clarity and simplicity.

Various attractions, services, facilities, entities or places may be near, or accessible from different route segments connecting, in whole or in part, start point 201 and end point 202, e.g., national park 220, restaurants 230, gas station 235, mountains 240 and lakes 245 and 250. According to embodiments of the invention, points such as exemplary points 203, 204, 205 and 206 shown in FIG. 2 may be selected such that they mark, indicate or denote segments of routes that may be related to one or more characteristics, properties, traits or qualities as described herein. For example, the route segment connecting points 201 and 206 (segment 201-206) may be near or through national park 220, segment 206-202 may enable access to restaurants 230 and gas station 235, segment 204-202 may run close to, or by lakes 245 and 250, and segment 201-205 may enable sightseeing of or driving through mountains 240.

In some cases, some of exemplary points 203, 204, 205 and 206 may be selected such that they correspond to roads or paths intersections, accordingly, a point may be associated with one, two or more route segments. Selecting points such as exemplary points 203, 204, 205 and 206 may be according to, or based on various characteristics, properties, attributes or other aspects. For example, a safety level of a route segment, e.g., based on statistical information on number and/or severity of accidents, a scenic property, a travel cost, e.g., tolls or ferries, trains or other costs, a travel time, a traffic load or density, e.g., average number of cars per mile, or any traffic information as known in the art, a travel speed, e.g., an average speed at which the route segment may be traveled, a length of the segment or various services that may be available along the segment, e.g., gas stations, garages etc. Any applicable parameter or aspect may be used for a determining route segments such as the exemplary segments shown in FIG. 2 and described herein.

According to embodiments of the present invention, weights may be computed for route segments and may further be associated with route segments. According to embodiments of the present invention, weights computed as described herein may be related to any applicable characteristic, property, trait, quality, property, attribute, measure, level, feature, aspect or element of a route or a route segment. According to embodiments of the present invention, a weight may reflect, indicate, signify or suggest a parameter such as a relevance, a rating, a grade, a significance, a measure, a level, an importance, an impact, or a score of a characteristic, property, trait, quality, property, attribute or other relevant aspect related to a route or route segment. For example, a weight may indicate a safety level, a scenic property, a travel cost, a travel time, a travel speed, an availability of or accessibility to a specific service, or a length related to a route segment as described herein. It will be recognized that the weights may have any numeric values, e.g., integer, real, etc., and may have any range, including from 0 to a maximum number, or from a negative minimum to positive maximum.

Figure 3:
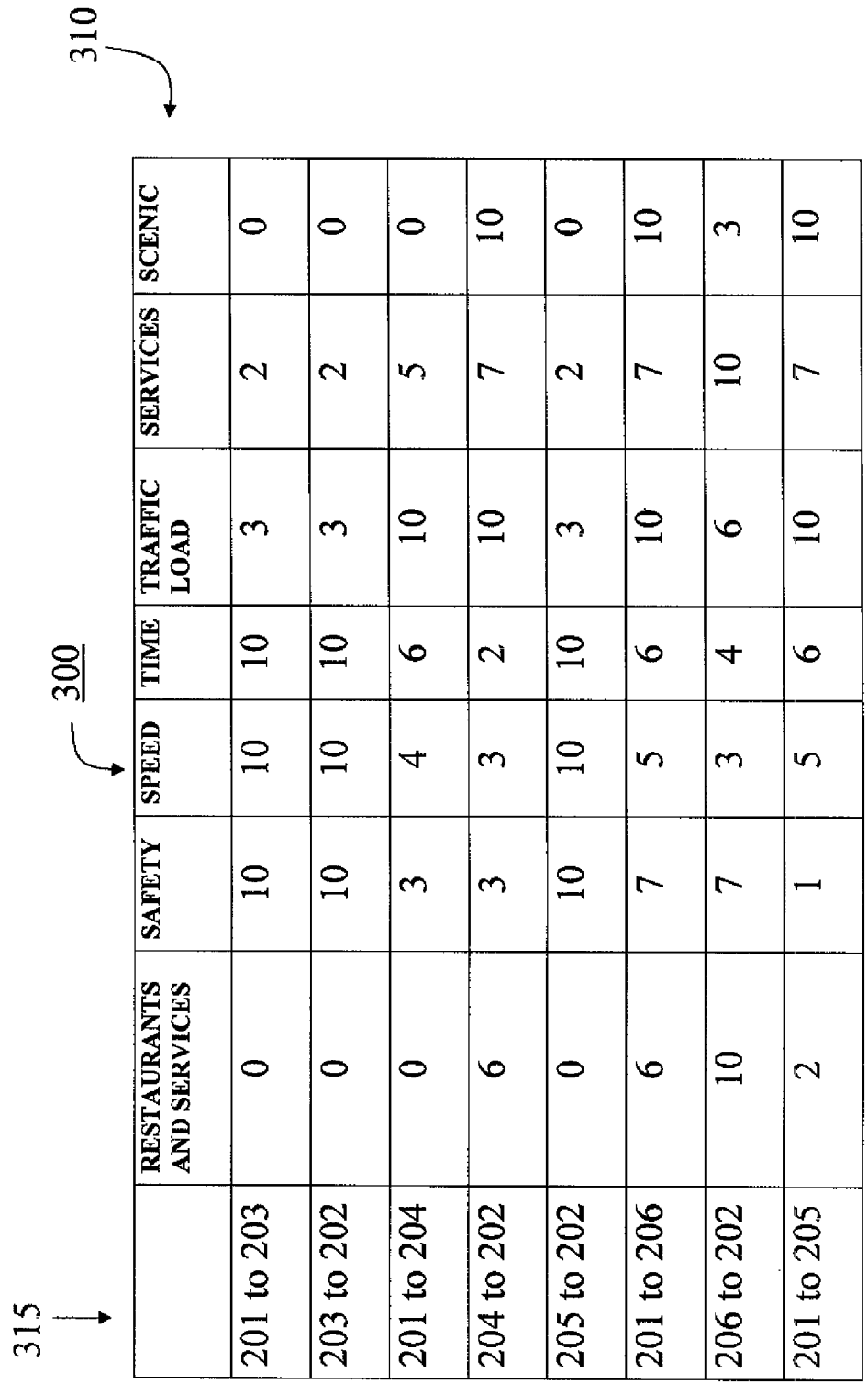
FIG. 3 is a table showing exemplary weights associated with route segments according to embodiments of the invention.

Reference is now made to FIG. 3, which shows an exemplary schematic data table 300 showing exemplary weights associated with route segments according to embodiments of the invention. As shown, table 300 includes a plurality of records, each record corresponding to a route segment, and each route segment record has a plurality of weights corresponding to different features. Header row 310 lists features for which weights are computed, calculated or otherwise determined and column 315 lists the route segment records for which feature weights are determined. The exemplary aspects for which exemplary weights are shown are listed in the top row of table 300. It will be recognized that FIG. 3 is a schematic illustration, and that any suitable data structure may be used to implement storage and retrieval of relevant information about the route segments according to embodiments of the invention.

In the example provided, the exemplary aspects are restaurants, safety, speed, time, traffic load, services and scenic. According to an exemplary embodiment of the invention, a greater weight may indicate favorable conditions while a lesser weight may indicate less favorable conditions, level or property. For example and as shown, segment 201-203 shown in FIG. 2 may be a very safe route segment, e.g., in terms of statistical knowledge of accidents in that segment, accordingly, a weight of ten (10) may be computed for a safety property of the segment. Segment 201-203 may further be a highway enabling fast driving and consequently short time to travel, accordingly, time and speed weights may be ten (10). However, segment 201-203 may have a lot of traffic through it and consequently, the weight of traffic load computed may be three (3) indicating that in terms of traffic load, this segment is not favorable. Likewise, for various possible reasons, segment 201-203 has few services along, e.g., few restaurants, gas stations and the like and no interesting landscape, for example, a desert road. Accordingly, weights of two (2) for services and zero (0) for scenic are computed for and associated with segment 201-203. As shown, segment 203-202 may be similar to segment 201-203.

As shown, segment 201-204 has no restaurants along it and accordingly a weight of zero (0) may be computed for this aspect of the segment. According to information available, segment 201-203 may not be as safe as, for example, segment 201-203, for example, historical information indicates a higher rate or probability of accidents in this segment compared to, for example, segment 201-203. Accordingly, a weight of three (3) is computed for the safety measure of this segment as shown. As shown, weights of four (4) and six (6) are associated with segment 201-204 with respect to speed and time possibly indicating slower driving than, for example, in segment 201-203. Likewise, as shown, limited services and sightseeing are available in segment 201-204.

As shown, segment 204-202 has some restaurants along it, light traffic, quite a few services and a lot of scenic view. However, as reflected by the weights associated with segment 204-202, driving may be slow and not particularly safe (safety, speed and time have respective weights of 3, 3 and 2) but, on the other hand, not many cars travel through this segment as shown by the weight of ten (10) computed for the traffic load measure. Such weights may typically reflect a possibly narrow road running by lakes such as lakes 245 and 250. Similarly and as shown in table 300, accessibility to restaurants 230 and gas station 235 from segment 206-202 is reflected by the respective ten (10) weights computed for the relevant aspects, the scenic weights of segments 201-206 and 201-205 reflect national park 220 and mountains 240 respectively. However, segment 201-205 may not be as safe, possibly due to narrow roads through hilly terrain near mountains 240.

According to embodiments of the invention, typically upon receiving start and end points from a user, e.g., points 201 and 202, a plurality of routes, courses, ways, tracks, lanes, or trails may be designed and/or generated. For example, an application on navigation server 135 may receive a coordinates of start and end points from a user operating wireless computing device 110, may generate routes and communicate information to wireless device 110, where such communicated information may enable displaying the generated routes and other related information on a display of wireless computing device 110. In some embodiments, two or more alternative routes may be generated. According to embodiments of the inventions, design and generation of a route may be according to one or more preferences or constraint parameters.

According to embodiments of the invention, the start point may be varied by an update from a mobile device, and the routes variably generated and communicated to the user device in real-time based on the updated current location. For example, a start point may initially be a home location or other origin, and the end point may be the desired destination. If a user device is a location-enabled mobile device, e.g., cellular or GPS device, the current location, which varies during the course of the trip, may be considered the start point, such that the method of the present invention may be repeated at a certain frequency to continually generate a plurality of available routes starting from the user's updated location to the desired destination, and to eliminate previously generated routes no longer applicable due to the updated current location.

According to embodiments of the invention, a main, base or default route may be generated. Typically, a base or default route is generated first. As described herein, a base route may be generated first and alternative routes may be generated based on it. Alternative routes may be compared, relatively scored or otherwise related to a base route. A base route may be generated according to a predefined set of parameters, e.g., the default or base route may be designed to be the shortest or fastest route from a starting point to an end point. For example, algorithms known in the art, e.g., Floyd-Warshall or Dijkstra algorithms or variations thereof may be used to calculate or compute a base route that is the shortest or fastest route from a start to an end location. Alternatively or additionally, a base route may be calculated or computed based on one or more user preferences.

As described herein, predefined parameters may be obtained from a user profile. For example, a user profile may be stored on storage 130. Accordingly, prior to generating a base route, route generation unit may receive a user profile from database server 125 or it may receive, e.g., from database server 125, required parameters from a user profile. One such parameter in a user profile may be a default preference. For example, a specific user may prefer a base route to be the safest route rather than the fastest or shortest one. Accordingly, either according to preconfigured parameters, according to user defined preferences or any other parameter or a combination of parameters, a base or default route may be generated.

A user profile may be updated based on user input or calculated data or information or any data obtained as described herein. For example, a user may provide grades or scores to routes and thus enable embodiments of the invention to improve, modify or otherwise maintain a user's profile to better suit or reflect the users' preferences. Information such as trip duration, average speed, number of stops and or locations visited may be used to modify a user's profile in order to enable future generation of routes to be closer to the user's preferences. Any information and methods for user profiling as known in the art may be used by embodiments of the invention to maintain a user profile. A user may export a user profile and likewise, import a profile, e.g., exported and communicated from a friend. Similarly, preferences may be inferred from a characterization of a route by a user. For example, a user may designate a trip as vacation, business travel, emergency, etc., and the system may have pre-stored preference values corresponding to the trip type. Thus, for example, vacation type trip may give high weights to scenery and restaurants, and an emergency trip may give high weights to travel time.

According to embodiments of the invention, alternative or possible routes from a starting point to an end point may be divided into route segments, for example, as shown by FIG. 2. According to embodiments of the invention, weights related to characteristics, properties, attributes or other aspects of segments may be computed as described herein. Such weights may be associated with the respective segments, for example, as shown by table 300. A plurality of alternative routes may be generated, a subset may be selected based on relevant criteria, and the selected plurality of alternate routes displayed to the user. For example, alternative routes may be generated based on a set of preferences or other parameters and based on weights associated with route segments as described herein. For example, if a preference indicates that the user prefers or would like a scenic route then embodiments of the invention may prefer route segments having a high weight associated with a scenic attribute. For example, examining table 300 shows that route segments 204-202 and 201-206 and 201-205 have a high weight related to scenic. Accordingly, a route generated may preferably include at least some of these segments. For example, if the user further indicates she does not view fast or short routes as important or preferable then a route form point 201 to point 202 through national park 220 and lakes 245 and 250 may be generated. Such route may include segments 201-206, 206-204 and 204-202. A user who prefers some sightseeing but also wants to stop at a restaurant on the way may provide different preferences and accordingly, a route through national park 220 and restaurants 230 may be generated, e.g., including segments 201-206 and 206-202. A base route generated as described herein may be generated by choosing segments such that one or more preferences are observed. For example, given start and end points 201 and 202 respectively and configured to generate a base route that is the fastest route, embodiments of the invention may generate a base route that includes segments 201-203 and 203-202 shown in FIG. 2.

According to embodiments of the invention, one or more scores may be computed for a route segment or for a route. .A score of a route or segment may be based on weights associated with the route, segment or a plurality of segments, e.g., a plurality of segments comprising a route. A score may be, include or comprise one or more values or indicators. For example, a score may grade or rate a route with respect to speed, length or distance, level of services, traffic load etc. A score may reflect a number of aspects. For example, for a first traveler, a route associated with high grades for speed and traffic loads, e.g., based on associated weights, may be scored high if the first traveler's preferences indicate the first traveler prefers fast driving while the same route may be differently scored for a second traveler who prefers scenic roads. A score may be relative or normalized. For example, a score of an alternative route, e.g., a route other than the base route may be relative to a score of the base or default route. Computing a score may involve various computations that may be based on weights and/or preferences. For example, a number of weights may be used together, e.g., weights related to speed and length or distance may be used together to produce a parameter that may reflect various aspects, e.g., duration. Any score may be defined by embodiments of the invention, may be computed or calculated as described herein and may be used, for example, in a selection of a route to be presented or as a relative score to be used for evaluating other scores. A score of a route may be computed based on a number of scores. For example, a number of preliminary scores related to a respective number of aspects, e.g., safety, speed and services may be computed. Based on such preliminary scores, a score for the entire route or segment may be computed. For example, computation of a score of a route may be based on preliminary scores as described herein and a user's preference parameter. Accordingly, the same route, possibly associated with the same preliminary scores may be associated with different route score when computed for different users. For example, a route that scored high when computed for a user who prefers fast driving may be scored lower for a user who prefers scenic roads.

According to embodiments of the invention, possibly after generating a base route, any number of alternative routes may be generated. In some embodiments, a number of alternative routes may be selected, based on their respective scores and may further be presented to a user. For example, following a generation of a base route, five (5) alternative routes may be generated as described herein. The five routes may be scored by examining the weights associated with their respective segments or performing computations based on such weights, and three (3) routes, possibly those with the highest scores may be selected for presentation to a user. In one embodiment a score may simply be a weight or a sum of weights. For example, the time scores of segments 201-203 and 203-202 may be ten (10) shown by the respective weights in table 300. Accordingly, a time score of a route including segments 201-203 and 203-202 may be higher than that of a route including segments 201-204 and 204-202 shown in FIG. 2. It will be realized that any method, algorithm, mathematic tool or other means may be employed by embodiments of the invention to compute scores as described herein. As discussed, a score may be relative, e.g., to a score of a base route, and also to a user preference. For example, a score of a route may be computed by relating various attributes, characteristics, properties or any relevant aspect of a route to preferences of a user or any other parameters. For example, if a user profile or selection indicates that the user prefers scenic routes then generated routes including segments associated with high weight for scenic may be scored higher than those including segments associated with low weight for scenic.

In the discussion herein, it will be realized that alternative routes are routes different from a base, main or default route but related to the base route in that they are routes from the same start and end locations with relation to which the base route was calculated. According to embodiments of the invention., alternative routes may be computed or calculated by selecting one or more segments in a base route and manipulating parameters related to such selected segments. For example, one or more weights associated with a selected segment may be modified. Such modification may be temporal and may be performed in order to cause a route calculating algorithm to generate a different route. For example, a base route may include a specific segment that may be associated with suitable weights. For example, a scenic segment (namely, a segment associated with a high scenic weight) may be included in a base route calculated for a traveler who prefers scenic roads. Such segment may temporarily be associated with a very low weight for scenic. Accordingly, in a computation of an alternative route, such segment may not be selected to be included in the alternative route, thus, the resulting alternative route will not include that specific segment and will, accordingly, be different from the base route. Other embodiments may simply mark one or more segments in a base route as ones who which are not to be included in a subsequently computed route. Accordingly, a route generation unit computing a route will not include such marked segments and will be forced to calculate a route that is different from the previously computed route, e.g., the base or main route described herein. In some embodiments, after removing a segment from the list of segments that may be included in a route or after modifying parameters associated with a segment such that its inclusion in a route may be reevaluated, the same algorithm and/or procedure used for calculating a base route may be repeated. As described herein, as a result of manipulating metadata related to a segment included in a base route, an alternative route that is different from a base route may be generated by repeating the procedure or methods used for generating a base route.

Various considerations, parameters, aspects or information may be used for selecting a segment to be prevented from being included in a generated route or for selecting a segment in order to modify related metadata or other parameters as described herein. For example, road numbers, road. names or other related parameters may be used. For example, a segment including a specific road, e.g., a section of highway 69, a road from a first main intersection to a second main intersection may be defined, denoted, treated or otherwise related to as a segment as described herein. Another example may be a segment as defined herein that includes a known road. Any parameters that may be used in order to segment a route or determine segments as described herein may be used for selecting a segment as discussed herein. A class and or function of a road may be observed when selecting a segment. For example, segments related to slow country roads may be selected for removal or manipulation such that alternative routes may avoid such segments and roads. For example, if a part of a base route includes a segment that includes a dirt track road, such segment may be removed, omitted or excluded from a list of segments to be included in an alternative route or parameters associated with such segment may be manipulated such that it may be less likely that such segment will be included in an alternative route. For example, some weights associated with a segment may be modified such that such segment is unlikely or less likely to be selected for inclusion in an alternative route. Manipulation of weights or parameters of a segment may be according to a user preference or predefined preferences. For example, if a user preference indicates that the user prefers scenic roads then by lowering a segment's weight related to scenic, the possibility of the segment to be included in a generated route may decrease as a route generation may be related to, or in accordance with, a user's preferences as described herein.

Another possible consideration or parameter that may be used or observed when selecting a segment may be a complexity parameter or aspect. For example, embodiments of the invention may select segments for removal or manipulation as described herein based on the number of junctions they include, the size or complexity of included junctions or intersections. Accordingly, an alternative route that may not be the best match to a user preference or a predefined preference may be simpler. Any applicable preferences or parameters may be used as guidance for selecting segments as described herein For example, by observing a user's preferences, segments that do not match such preferences may be removed, omitted or excluded or have their metadata manipulated as discussed herein such that they may not be or are less likely to be included in a subsequently generated route, e.g., an alternative route generated after a base route. Statistical data or information may be used in the selection of segments as discussed herein. For example, segments may be removed such that an alternative route is as close as possible to a route statistically taken or preferred by travelers from the same start and end points or an alternative route may otherwise be generated such that it corresponds to a route typically chosen, e.g., according to statistical results or parameters.

According to embodiments of the invention, a plurality of alternative routes may be graphically displayed, for example, all overlaid on a single map. In cases where too many routes are generated for a single view, a number of sets may be displayed, for example, a user may scroll through screens or views. In some embodiments, a base route may be displayed with a number of sets of alternative routes. A user may select the set of routes ranked by various criteria, e.g., most scenic routes, most commercial establishments routes, most rapid routes, shortest routes, etc. The rankings may be displayed by a ranking, e.g., by a numeral denoting 1st ranking, 2nd ranking, etc. Alternatively, the routes may be coded by color or shading. In some embodiment, the top-ranking route for each criterion may be displayed, for example, the user may view superimposed on the same map the most scenic route, the most commercial establishments route, the most rapid route, and the shortest route. It will be understood that in some instances some of these routes may overlap, e.g., the shortest route may also be the most rapid route, in which case, the display may indicate that a displayed route has both these characteristics.

In some embodiments of the invention, the number of routes displayed may be set by the user, or may be selected based on the results. For example, if the route scores for a particular category, e.g., scenic, are: 9, 8.5, 7, 3 and 2 (out of 10), then only the top three routes may be selected and displayed; however, if the route scores for the category are: 9, 8.5, 3.5, 3 and 2, then only the top two routes may be selected and displayed.

Figure 4:
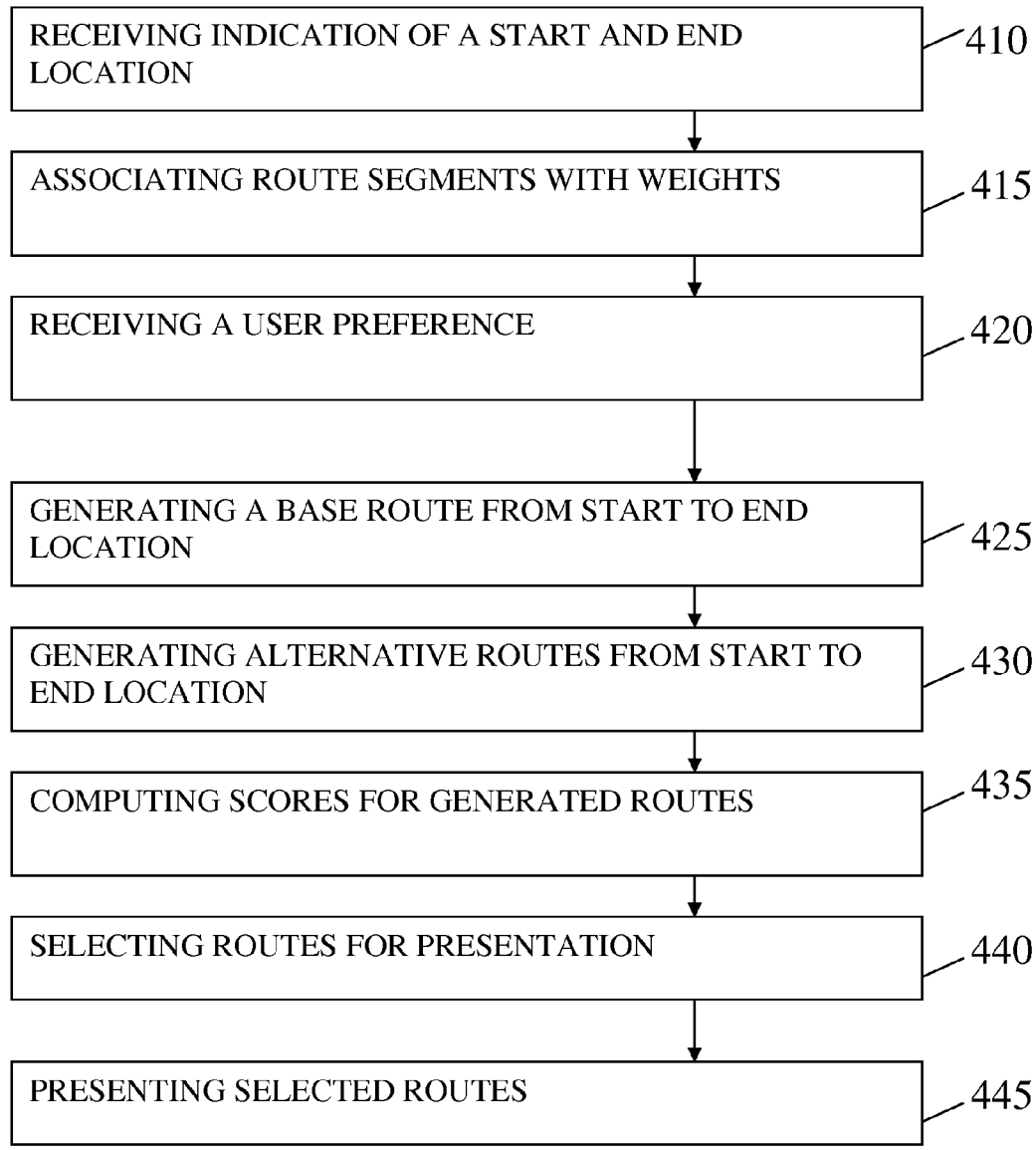
FIG. 4 is an exemplary flowchart describing a method of generating a route according to embodiments of the invention.

Reference is made to FIG. 4 which is an exemplary flowchart 400 describing a method of generating a route according to embodiments of the invention. As shown by block 410, the flow may include receiving indication of a start and end location. For example, a user may click on a start and end location or points of a trip in a web page, e.g., on a touch screen of wireless computing device 110 or by selecting a state, city, street and street number combination from a pull down menu or by any other way for selecting a location or coordinates as known in the art.

As shown by block 415, the flow may include associating route segments with weights. For example, as shown by table 300, weights may be determined and associated with route segments shown in FIG. 2. Generation of weights may be based on any applicable information. For example, atlases or cartographical information, weather reports, traffic reports, news or events may all be information relevant to associating a route segment with a weight. Information used for computing weights or generating routes may come from any applicable source. For example, a news broadcast reporting an accident or traffic jam may cause a recalculation of specific weights of some segments, festivals or happenings announced in local or mass media may be reflected in weights, likewise, various statistics related to route segments may be used, e.g., retrieved from storage 130 or any applicable source etc. Weights may be computed with respect to a set or list of aspects, properties or characteristics of interest. For example, some exemplary aspects or characteristics of interest are shown in row 310 of table 300. Fields of interest for which weights may be computed may be added, dynamically or otherwise. For example, a user may update his profile or a display, in real-time, so that weather conditions will become a relevant aspect and will be reflected in a route score. Accordingly, an additional column may be added to table 300 and weights reflecting weather may be computed for segments. For example, a high weight may be attributed to route segments with clear sky or sunny weather and a low weight may be associated with route segments in currently rainy areas. Weights may be dynamical in a number of ways. First, computing weights may be dynamic in the sense that at any time, e.g., during traveling, possibly after traveling a part of a route, a user may add preferences and cause embodiments of the invention to re-compute or calculate weights, scores and routes. For example, a user traveling through a number of states may prefer to travel through less states as possible, e.g., in order to avoid borders. Such user may add, at any time, e.g., while planning the journey at home using computing device 115 or after the trip already started, using wireless computing device 110, a preference or configuration parameter related to number of states visited or borders crossed. Accordingly, a weight of a segment may reflect the number of border crossings needed in order to travel through the segment. Consequently, routes may be scored based on a total number of states visited or borders crossed. Another dynamic aspect of weight calculation according to embodiments of the invention is the possible calculation of weights according to dynamic, real-time or online information. For example, real-time weather or other reports may cause embodiments of the invention to recalculate weights for segments and possibly regenerate routes based on such real-time calculation of weights. Another dynamic aspect of the invention may be dynamically providing indications based on a location of a user, a user profile and information related to a route segment. For example, a pop-up may be presented on a screen of a mobile device indicating that a specific event is taking place in a vicinity of a segment traveled or about to be traveled by a user.

As shown by block 420, the flow may include receiving a user preference. Although according to some embodiments a base route may be generated based on preconfigured parameters, e.g., the base route is the shortest route, in some embodiments, a base route may be generated based on information received from a user or extracted from a user's profile. As described herein, instead of generating a default or base route based on preconfigured parameters, a user's preference may be observed when generating a base route. For example, a more scenic route may be the default or base route for a first user while a route with as many restaurants may be the default route for another user. As shown by block 425, the flow may include generating a base route from start to end location. For example, a base route from starting point 201 to end point 202 shown in FIG. 2 may be the route including segments 201-203 and 203-202 as shown.

As shown by block 430, the flow may include generating alternative routes from start to end location. The number of alternative routes may be configured or selected by a user. For example, a first user may be interested in seeing or being provided with five alternative routes while a second user may be interested in only two alternative routes. Alternative routes may be generated by associating route segments into routes as described herein. Any algorithm mathematical tool or other means may be used in order to generate routes from route segments based on segments weights and attributes and based on preferences as described herein.

As shown by block 435, the flow may include computing scores for generated routes. As described herein, scores may be computed and associated with routes. As described herein, a score may reflect a relation of a route to a user preference, e.g., how scenic is the route with respect to a user's preference, how safe is the route with respect to importance of safety as viewed by the user. A score of a first route may be related to a score of a second route. For example, how close is an alternative route to a base route in terms of distance, safety, speed, traffic conditions or any other parameter. A score of a route may include sub-scores related to specific aspects. For example, a first route may be associated with a high score for services but low score for speed. Relating scores may be done by relating specific aspects and/or relating a total score of the relevant routes.

As shown by block 440, the flow may include selecting routes for presentation. Any number of alternative routes may be generated as shown by blocks 425 and 430. From the set of generated routes, a subset may be selected for presentation. Selection may be according to a user preference as described herein and may additionally take into account limitations or constraints such as screen size etc. According to embodiments of the invention, routes generated may be associated with names that may be meaningful, e.g., comprise road numbers, road names, state names or any other relevant information. Such names may be displayed or otherwise presented with the presented routes. For example, if a first route traverses road number 56 and road number 77 and a second route traverses roads 56 and 85 then the names "route 56-77" and "route 56-85" may be respectively assigned to such routes and may be easily identified by a user. Another example of associating a route with a name may be "scenic" for a route selected with scenic as a preference. In addition or alternatively, route names may be assigned by a user. For example, provided with a proper interface, e.g., graphical user interface (GUI) as known in the art, a user may select or compose a name and associate such name to a specific route. A generated route may be stored, e.g., in local memory or remote memory. Any applicable data, parameters or information may be stored with a stored route. For example, metadata such as the name of the route, the date generated or traveled etc. may all be stored and later retrieved and displayed, e.g., when a route is retrieved and displayed. Any related or applicable data, parameters or information may be used in naming a route as described herein, for example, a state name, a direction, e.g., "north", a weather condition, e.g., when traveled etc.

As shown by block 445, the flow may include presenting selected routes. For example, routes may be presented graphically as known in the art. According to embodiments of the invention, presenting routes may include displaying a graphical indication of at least one attribute of a route and displaying a legend information. For example, scenic parts or segments of a route may be shown green while rainy parts may be gray. Other graphical displays may include a bar chart indicating a safety level, an average speed etc. A legend may be displayed enabling translation of colors or symbols to aspects, e.g., green is scenic and gray is bad weather.

Figure 5:
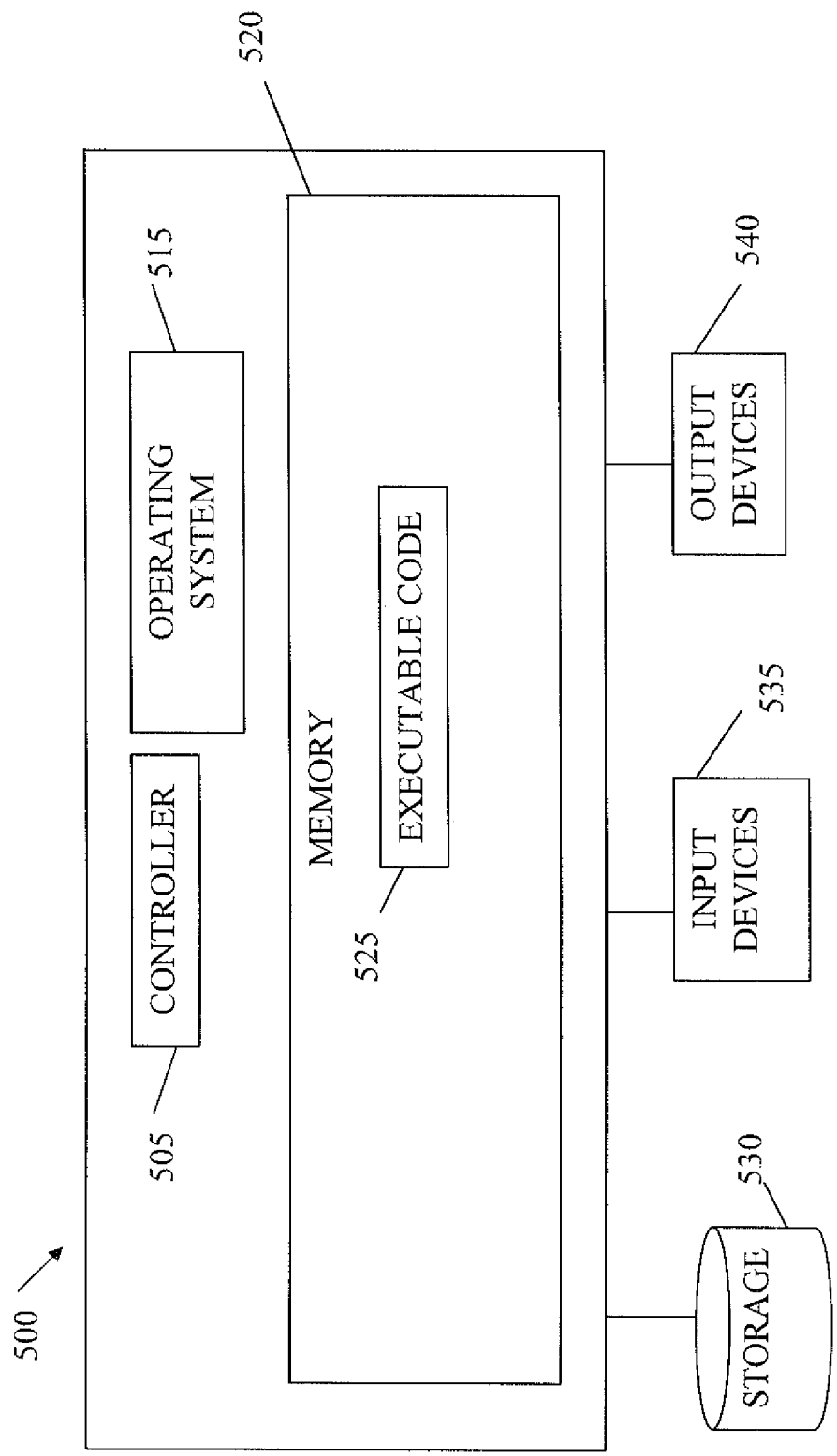
FIG. 5 is a high level block diagram of an exemplary computing device according to embodiments of the present invention.

Reference is made to FIG. 5, showing a high level block diagram of an exemplary computing device according to embodiments of the present invention. Computing device 500 may include a controller 505 that may be, for example, a central processing unit processor (CPU), a chip or any suitable computing or computational device, an operating system 515, a memory 520, a storage 530, an input device 535 and an output device 540.

Operating system may be or may include any code segment designed and/or configured to perform tasks involving coordination, scheduling, arbitration, supervising, controlling or otherwise managing operation of computing device 500, for example, scheduling execution of programs. Operating system 515 may be a commercial operating system. Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 may be or may include a plurality of, possibly different memory units.

Executable code 525 may be any executable code, e.g., an application, a program, a process, task or script. Executable code 525 may be executed by controller 505 possibly under control of operating system 515. For example, executable code 525 may be or may include route generation unit 145. Storage 530 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Input devices 535 may be or may include a mouse, a keyboard, a touch screen or pad or any suitable input device. It will be recognized that any suitable number of input devices may be operatively connected to computing device 500 as shown by block 535. Output devices 540 may include one or more displays, speakers and/or any other suitable output devices. It will be recognized that any suitable number of output devices may be operatively connected to computing device 500 as shown by block 540. Any applicable input/output (I/O) devices may be connected to computing device 500 as shown by blocks 535 and 540. For example, a network interface card (NIC), a printer or facsimile machine, a universal serial bus (USB) device or external hard drive may be included in input devices 535 and/or output devices 540. According to embodiments of the invention, wireless computing device 110, computing device 115, database server 125 and navigation server 135 may comprise all or some of the components comprised in computing device 500 as shown and described herein.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein. For example, a storage medium such as memory 520, computer-executable instructions such as executable code 525 and a controller such as controller 505. Some embodiments may be provided in a computer program product that may include a machine-readable medium, stored thereon instructions, which may be used to program a computer, or other programmable devices, to perform methods as disclosed above.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:

receiving from a client computing device a first set of coordinates related to a first location, a second set of coordinates related to a second location, and receiving a plurality of route feature preferences from a user profile of a user of the client computing device;

using one or more computing devices having one or more processors to select a subset of possible routes, including:

generating a plurality of possible routes from said first location to said second location, wherein each of said possible routes comprises one or more route segments, said route segments obtained from a table including a plurality of entries each entry associated with one of the route segments and including a plurality of weights, each weight corresponding to one of a plurality of route features of the route segment with which it is associated, wherein one or more route segments of a first possible route are selected and one or more of a plurality of weights of said one or more route segments are temporally modified to cause a different one of said plurality of possible routes to be generated, said route features including availability of one or more services;

computing a route score for each of said plurality of possible routes, said route score based on a plurality of sub-scores each for one of the plurality of route features and corresponding weight of the route feature of each route segment in the possible route for which the route score is computed, and further including computing the route score based on the plurality of sub-scores and the plurality of route feature preferences;

selecting said subset of possible routes based on said route score for each of said plurality of possible routes; and sending said selected subset of possible routes to said client computing device to enable said selected subset of possible routes to be displayed on a display of said client computing device.

2. The method of claim 1, comprising:

receiving the plurality of route feature preferences from the client computing device; and using said one or more computing devices computing for each of said plurality of possible routes a plurality of route scores based respectively on said route feature preferences, wherein said selecting comprises selecting the route having the best score for each of said plurality of route feature preferences.

3. The method of claim 1, wherein said route features of the route segment include additional features selected from a group consisting of:
a safety level, a scenic property, a travel cost, a travel time, a travel speed, and a length.

4. The method of claim 1, comprising sending to said client computing device a property comprising a name or a ranking with each said selected subset of possible routes.

5. The method of claim 1, further comprising, at said one or more computing devices, receiving a revised first location based on a real time update location of said user, and performing said steps of generating, computing, selecting, and sending with respect to said revised first location.

6. The method of claim 1, using said one or more computing devices, retrieving said route feature preference from said user profile.

7. The method of claim 1, comprising, using said one or more computing devices:
generating a base route from said first location to said second location, said base route comprising at least two route segments;
selecting at least one segment included in said base route;
temporally modifying at least one weight associated with said at least one selected segment such that a subsequently generated route from said first location to said second location excludes said at least one selected segment from the subsequently generated route; and
generating an alternative route from said first location to said second location, wherein said alternative route is different from said base route.

8. The method of claim 1, comprising, using said one or more computing devices:
associating at least some of said plurality of possible routes with a respective plurality of meaningful names, said plurality of meaningful names based on at least one of: a road number, a road name and a preference; and sending said plurality of meaningful names to said client computing device for display in association with said subset of possible routes.

9. The method of claim 1, wherein the one or more services comprise one or both of gas stations and garages.

10. The method of claim 1, wherein the one or more services comprise restaurants.

11. The method of claim 1, further comprising dynamically updating the table to include an additional weight and corresponding to an additional route feature, when the user updates the user profile to include an additional route feature preference.

12. A system comprising:
a server computer comprising a processor, a memory, a first storage, and a hardware route generation unit; and
a storage coupled to the hardware route generation unit, the storage to store a table having a plurality of entries each entry associated with a route segment and to store a plurality of weights, each weight corresponding to one of a plurality of route features of the route segment with which it is associated, said route features including availability of one or more services;
wherein the hardware route generation unit is to:
receive from a client computing device a first set of coordinates related to a first location, a second set of coordinates related to a second location, and receive a plurality of route feature preferences from a user profile of a user of the client computing device;
generate a plurality of possible routes from said first location to said second location, wherein each of said possible routes comprises one or more route segments, said route segments obtained from the table, wherein said hardware route generation unit is to select one or more route segments of a first possible route and temporally modify one or more of a plurality of weights of said one or more route segments to cause a different one of said plurality of possible routes to be generated;
compute a route score for each of said plurality of possible routes, said route score based on a plurality of sub-scores each for one of the plurality of route features and corresponding weight of the route feature of each route segment in the possible route for which the route score is computed, wherein the route score is computed based on the plurality of sub-scores and the plurality of route feature preferences;
select a subset of possible routes based on said route score for each of said plurality of possible routes; and
send said selected subset of possible routes to said client computing device to enable said selected subset of possible routes to be displayed on a display of said client computing device.

13. The system of claim 12, wherein the system is coupled to the client computing device via a wireless network.

14. The system of claim 12, wherein the system is coupled to the storage via a wired network, the storage further coupled to a database server, wherein the system comprises a navigation server.

15. At least one non-transitory computer readable storage medium comprising instructions that when executed enable a system to:
receive from a client computing device a first set of coordinates related to a first location, a second set of coordinates related to a second location, and receive a plurality of route feature preferences from a user profile of a user of the client computing device;
generate a plurality of possible routes from said first location to said second location, wherein each of said possible routes comprises one or more route segments, said route segments obtained from a table including a plurality of entries each entry associated with one of the route segments and including a plurality of weights, each weight corresponding to one of a plurality of route features of the route segment with which it is associated, wherein one or more route segments of a first possible route are selected and one or more of a plurality of weights of said one or more route segments are temporally modified to cause a different one of said plurality of possible routes to be generated, said route features including availability of one or more services;
compute a route score for each of said plurality of possible routes, said route score based on a plurality of sub-scores each for one of the plurality of route features and corresponding weight of the route feature of each route segment in the possible route for which the route score is computed, and further including to compute the route score based on the plurality of sub-scores and the plurality of route feature preferences;
select a subset of possible routes based on said route score for each of said plurality of possible routes; and
send said selected subset of possible routes to said client computing device to enable said selected subset of possible routes to be displayed on a display of said client computing device.

16. The at least one non-transitory computer readable medium of claim 15, further comprising instructions that when executed enable the system to receive the plurality of route feature preferences from the client computing device, and compute for each of said plurality of possible routes a plurality of route scores based respectively on said route feature preferences, wherein said subset selection comprises selection of the route having the best score for each of said plurality of route feature preferences.

17. The at least one non-transitory computer readable medium of claim 16, further comprising instructions that when executed enable the system to select from a group consisting of a safety level, a scenic property, a travel cost, a travel time, a travel speed, and a length.

18. The at least one non-transitory computer readable medium of claim 15, further comprising instructions that when executed enable the system to send a property comprising a name or a ranking with each said selected subset of possible routes for display.

19. The at least one non-transitory computer readable medium of claim 15, further comprising instructions that when executed enable the system to receive a revised first location based on a real time update location of said user, and perform said generation, computation, selection, and sending with respect to said revised first location.

20. The at least one non-transitory computer readable medium of claim 15, further comprising instructions that when executed enable the system to retrieve said route feature preference from the user profile, and generate a base route from said first location to said second location, said base route comprising at least two route segments, select at least one segment included in said base route, temporally modify at least one weight associated with said at least one selected segment such that a subsequently generated route from said first location to said second location excludes said at least one selected segment from the subsequently generated route, and generate an alternative route from said first location to said second location, wherein said alternative route is different from said base route.

* * * * *